United States Patent

[11] 3,604,280

| [72] | Inventor | Marion H. Davis |
| | | Hagerstown, Ind. |
| [21] | Appl. No. | 23,360 |
| [22] | Filed | Mar. 27, 1970 |
| [45] | Patented | Sept. 14, 1971 |
| [73] | Assignee | Ferraloy, Inc. |
| | | Salem, Ind. |

[54] SPRING-CONTROLLED SHIFT SPEED ON DRIVEN VARIABLE PITCH PULLEY
12 Claims, 5 Drawing Figs.

[52] U.S. Cl. .................................................... 74/230.17
[51] Int. Cl. ...................................................... F16h 55/52
[50] Field of Search........................................... 74/230.17
C, 230.17 TL, 230.17 A, 217

[56] References Cited
UNITED STATES PATENTS

| 2,916,926 | 12/1959 | Albertson et al. | 74/230.17 C |
| 3,114,271 | 12/1963 | Davis | 74/230.17 |
| 3,267,759 | 8/1966 | Uduardi | 74/230.17 |
| 3,287,987 | 11/1966 | Getz et al. | 74/230.17 |

Primary Examiner—C. J. Husar
Attorney—Woodard, Weikart, Emhardt & Naughton

ABSTRACT: A driven variable pitch pulley, employing a garter spring to change pulley diameter, is provided with an additional garter spring to elevate the speeds required to obtain decreases in pulley diameter.

PATENTED SEP 14 1971  3,604,280
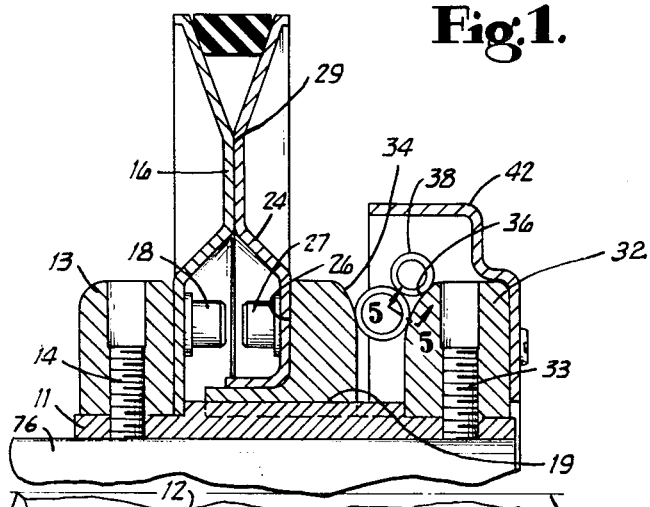
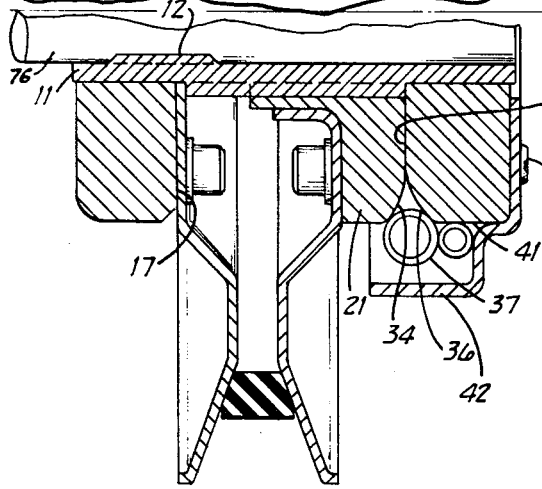
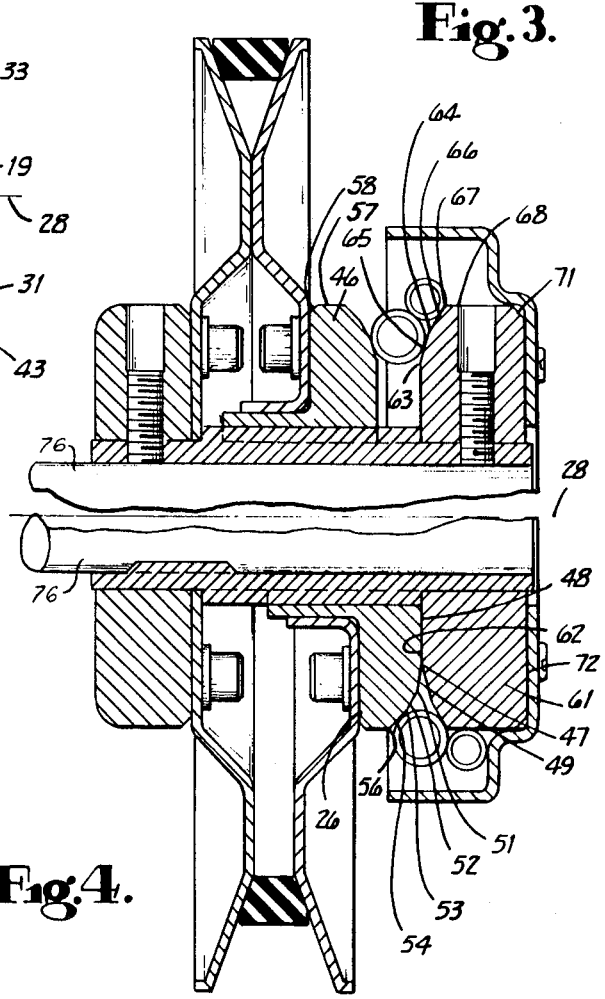
INVENTOR
MARION H. DAVIS
BY
Woodard Weikart Emhardt & Naughton
ATTORNEYS

3,604,280

SPRING-CONTROLLED SHIFT SPEED ON DRIVEN VARIABLE PITCH PULLEY

BACKGROUND OF THE INVENTION

1. Field of the Invention

This invention relates generally to variable pitch pulleys, and more particularly, to means for controlling speeds at which pitch changes are effected.

2. Description of the Prior Art

The most pertinent prior art of which I am aware, is the pulley described and claimed in my U.S. Pat. No. 3,114,271 issued Dec. 17, 1963. As was true before my invention of that pulley, it remains true to this day that optimum vehicle performance can only be attained by making the best use of the available power to move the load in the existing operating conditions. Optimum performance is essential in competitive vehicles, and there are situations in which it is desirable to elevate engine speeds at which drive ratios are changed, but employing equipment and components within existing space and weight limitations. The present invention is directed towards attainment of that objective.

SUMMARY OF THE INVENTION

Described briefly, in a typical embodiment of the present invention, the pitch changing garter spring of a variable pitch pulley is supplemented by an additional garter spring selected to increase the available bias for increasing the resistance of the pulley to a reduction in pitch diameter, to thereby raise the engine speed at which the pitch change will occur.

BRIEF DESCRIPTION OF THE DRAWINGS

FIG. 1 is a partial longitudinal cross section of a typical embodiment of the present invention, showing the pulley in a high pitch diameter ("low gear") condition.

FIG. 2 is a section similar to FIG. 1 and showing the embodiment thereof in a low pitch diameter condition.

FIG. 3 is a section similar to FIG. 1 showing the stepped-cone-combination cam surfaces instead of the smooth convex cam surfaces of FIG. 1.

FIG. 4 is the embodiment of FIG. 3 in a low pitch diameter condition.

FIG. 5 is an enlarged section through several coils of a garter spring, the section being taken at line 5—5 in FIG. 1 and viewed in the direction of the arrows.

DESCRIPTION OF THE PREFERRED EMBODIMENTS

Referring now to the drawings in detail, a support tube 11, cylindrical in nature, and having a built-in key 12, therein, has a hub 13 affixed thereto by circularly spaced socket-head setscrews 14. A formed steel pulley half 16 is affixed to the inner face 17 of the hub by a plurality of circularly spaced capscrews 18.

Splines 19 are provided on the tube 11 and receive a movable intermediate member 21 slidable thereon back and forth in the direction of the arrows 22 and 23. The other pulley-half 24 is affixed to the inner face 26 of the member 21 by a plurality of circularly spaced capscrews 27. Both pulley-halves are concentric with the central axis 28. Pulley-half 24 is movable between a high-pitch, "low-gear" position of abutment of the halves at 29 as shown in FIG. 1, to a position of separation of the halves when the member 21 sides in the direction of arrow 23 into a position of abutment thereof with the face 31 of the fixed cam member 32 secured to the tube 11 by a plurality of circularly spaced setscrews 33.

The member 21 has a curved-convex cam surface 34 thereon generally facing a curved-convex cam surface 36 on the member 32, both of the surfaces having slopes which increase at decreasing radii from the center or rotational axis 28. A spring 37 is supported between these cam faces. According to one feature of the present invention, an additional garter spring 38 is supported on the cam face 36 and on the spring 37. A further feature is the provision of a surface of very low slope at 41. A spring cover is provided at 42 and affixed to the outer member 32 by a plurality of circularly spaced screws 43.

Referring to FIG. 3, a "crowned-convex cam surface" is provided on the movable member 46 which, in other respects, may be the same as the member 21 of FIG. 1. In this embodiment, a conical surface 49 of steep slope with respect to axis 28, (15° from the plane of the face 48) is provided from a circle through point 47 on face 48 outward to a circle through point 51. A second conical surface 52 is provided outwardly from the circle 51 and is of a lesser slope, although still quite high, being approximately 30° from the vertical plane of the face 48. This surface 52 extends out to a circle through a point 53.

A third conical surface 54 of lesser slope (45° from the plane of face 48) is provided out to the circle through a point 56. Then surface 57 of very shallow slope (approximately 88° from the plane of face 48) is provided and extends axially to the chamfer 58 at the pulley half mounting face 26. As an example, in a clutch having a diameter nominally 2.692 at circle 56, the diameter at circle 53 may be nominally 2.474; that at circle 51 may be 2.312; and that at circle 47 may be 1.958.

In a somewhat similar fashion, member 61 is provided with a very steep conical surface (approximately 15° from the plane of face 62) extending between a circle 63 and a circle 64, this conical surface 65 being followed radially outwardly by a conical surface 66 of lesser slope (approximately 30° from the plane of face 62 for example) which extends out to the circle 67. From that point, a conical surface 68 of very shallow slope (approximately 88° from the plane of face 62) extends axially to the circle 69 at the chamfer 71 which intersects the outer mounting face 72 for the cover plate 42. Again by way of example, where the diameter of the circle 67 is nominally 2.692, the diameter of the circle 64 may be 2.312 inches and the diameter of the circle 63 may be 1.968 inches.

Referring now to FIG. 5, which is a cross section of the wire of the spring 37, it will be noted that the portion of each of the three illustrated turns which is exposed at the exterior of the coil is flattened at 73. This construction is provided for contact of the spring against the cam face of a line around a circle, instead of the point contact at a plurality of points around the circle which would be the case if the exterior of the wire were not flattened. The line contact provides better endurance characteristics without requiring particularly hard surfaces on the cams. In fact, hardened powdered metal can be employed for both of the members 21 and 32. Spring 38 may also have the flattened coil surfaces.

In the operation of the present invention the position of the slidable cam and pulley half will be determined by the tension on the belt. Normally, at comparatively low engine speeds, the drive pulley on the engine will be at a low pitch-diameter condition. Accordingly, the slack in the belt permits the springs 37 and 38 to move the slidable pulley-half in the direction of arrow 22 toward a high-pitch condition of abutment of the two pully-halves as shown in FIGS. 1 and 3.

As the engine speed increases, the effective pitch radius of the engine pulley increases, tightening the belt and tending to urge the pulley-halves apart. This is resisted by the presence of the spring 37 on the high slope portions of the cam surfaces as shown in FIGS. 1 and 3. However, increasing tension on the belt as the engine speed continues to increase the pitch diameter of the engine pulley will urge the spring 37 outwardly on the cam surfaces. The presence of the control spring 38 urging the spring 37 inwardly necessitates increased belt tension over that which would otherwise be required. In order to accomplish this, the engine speed must still further increase to expand the pitch radius on the engine output pulley. Thus the speed at which the pulley of the present invention achieves any given pitch diameter is dependent upon the total spring-bias and can be increased by providing a higher tension in the spring 38. At some point, the spring 38 finally rides over the crest 67 and onto the low-slope surface whereupon virtually the entire control of pitch diameter is that attributable to the spring 37. Nevertheless, as the belt tension decreases due to subsequent decrease of engine speed, or changing load conditions, and the spring 37 moves radially inward, the control spring 38 will follow along the surface 41 and, upon passing over the edge of the low-slope surface begins to again exert a significant bias urging the movable pulley half toward the high-pitch condition.

It is preferable that the springs 38 and 37 be wound in the same direction so that the turns of the one contacting the turns of the other will do so in a crossing sense, rather than an aligned sense. This will preclude the possibility of the coil of the one spring becoming interengaged between the coils of the other spring.

The embodiment of the invention in FIGS. 3 and 4 may be easier to manufacture because of the simple conical surfaces involved, as distinguished from the continuously curved-convex cam surfaces involved in the embodiment of FIGS. 1 and 2.

In the illustrated embodiment of the invention, the support tube is keyed to the shaft 76 which may be connected directly or through an appropriate chain drive or otherwise, to a vehicle drive wheel. A variety of spline types may be employed, but the hexagonal spline described in my aforementioned patent may be used readily. It should also be recognized that the present invention need not be limited in its application to vehicles, as a wide variety of other environments might be served just as well.

It is preferable that the springs be selected such that when in the "low-gear" high-belt-pitch diameter condition (FIGS. 1 and 3), each of the springs have some internal tension therein tending to cause it to move radially inward. In other words, the free length (circumference) of each spring, where the turns thereof would solidly engage other turns thereof, is less than the circumference which it can attain at the innermost extent of its radial travel between the cam faces.

The invention claimed is:

1. A variable-pitch pulley comprising: a power transmitting member for connection to a device to be driven by the pulley, said member having a first pulley face thereon with an axis of symmetry; an intermediate member mounted on said transmitting member and having a second pulley face thereon coaxial with and facing said first face, said intermediate member being axially movable on said transmitting member to vary the spacing between said faces and thereby vary the pitch diameter of said pulley, said intermediate member having a first surface thereon facing in a direction opposite the facing direction of said second pulley face; a shoulder on said transmitting member and having a second surface thereon facing said first surface, one of said surfaces being a cam surface; first resilient garter means received between said surfaces and engaging said surfaces to bias said second pulley face toward said first pulley face, said cam surface having greater slopes at lesser radial distances from the said axis to increase the force of said bias as spacing between said pulley faces decreases, and decrease tension in said resilient garter means as spacing between said pulley faces decreases, and second resilient garter means supported by one of said surfaces and by said first resilient means and biasing said first resilient means inwardly to increase the force biasing said second pulley face toward said first pulley face.

2. The pulley of claim 1 wherein:
the surface supporting said second garter means is said cam surface.

3. The pulley of claim 1 wherein:
one of said members has an outer surface extending axially from a radially outermost circle on the surface supporting said second garter means to receive said second garter means thereon when the spacing between said pulley faces increases beyond a predetermined amount.

4. The pulley of claim 1 wherein:
said pulley faces engage a belt therebetween the pitch diameter of said belt increasing as the spacing between said pulley faces is decreased by said first garter means, said first garter means having tension therein when the spacing between said pulley faces is at a minimum limit for maximum pitch diameter of said belt.

5. The pulley of claim 4 wherein:
said first garter means is a spring with a free length such that tension therein continues to bias said second pulley face toward said first pulley face when said spacing is at said minimum limit.

6. The pulley of claim 5 wherein:
said second garter means is a spring with a face length such that tension therein biases said second pulley face toward said first pulley face when said spacing is at said minimum limit.

7. The pulley of claim 6 wherein:
said garter springs include coiled spring wire flattened at the outer circumference of the coils to provide curved line contact of said springs on said one surface.

8. The pulley of claim 1 wherein:
said garter means are coiled wire garter springs, both springs being wound in the same direction.

9. The pulley of claim 1 wherein:
said cam surface is a curved-convex surface.

10. The pulley of claim 1 wherein:
said first and second surfaces are curved-convex cam surfaces,
said first and second resilient garter means are garter springs,
both of said cam surfaces having slopes continuously increasing at decreasing radial distances from said axis.

11. The pulley of claim 1 wherein:
said cam surface is a combination conical surface.

12. The pulley of claim 1 wherein:
both of said surfaces are combination conical surfaces.